United States Patent
Iwashita et al.

(10) Patent No.: US 10,234,574 B2
(45) Date of Patent: Mar. 19, 2019

(54) RADIATION IMAGING APPARATUS, RADIATION IMAGING SYSTEM, AND IRRADIATION START DETECTION METHOD

(71) Applicant: CANON KABUSHIKI KAISHA, Tokyo (JP)

(72) Inventors: Atsushi Iwashita, Saitama (JP); Toshio Kameshima, Kawasaki (JP); Hideyuki Okada, Honjo (JP); Eriko Sato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/885,090

(22) Filed: Jan. 31, 2018

(65) Prior Publication Data
US 2018/0172851 A1    Jun. 21, 2018

Related U.S. Application Data

(63) Continuation of application No. 15/182,863, filed on Jun. 15, 2016, now Pat. No. 9,910,169.

(30) Foreign Application Priority Data

Jun. 17, 2015 (JP) .................. 2015-122115

(51) Int. Cl.
*G01T 1/29* (2006.01)
*H04N 5/32* (2006.01)

(52) U.S. Cl.
CPC ................. *G01T 1/29* (2013.01); *H04N 5/32* (2013.01)

(58) Field of Classification Search
CPC ........... G01T 1/17; G01T 1/24; G01T 1/2928; G01T 1/29; H04N 5/32
See application file for complete search history.

(56) References Cited

U.S. PATENT DOCUMENTS

| 9,035,265 B2 | 5/2015 | Yagi et al. |
| 9,239,390 B2 | 1/2016 | Sato et al. |
| (Continued) | | |

FOREIGN PATENT DOCUMENTS

| EP | 2685710 A2 | 1/2014 |
| EP | 2773105 A2 | 9/2014 |
| JP | 2014-023957 A | 2/2014 |

OTHER PUBLICATIONS

Search and Examination Report issued in corresponding application No. GB 1610508.2 dated Feb. 10, 2017.

*Primary Examiner* — David P Porta
*Assistant Examiner* — Fani Boosalis
(74) *Attorney, Agent, or Firm* — Carter, Deluca, Farrell & Schmidt, LLP

(57) ABSTRACT

A radiation imaging apparatus includes a pixel array having a plurality of pixels configured to detect radiation, a detector configured to detect radiation irradiation, and a controller. In a case in which a measured value obtained by using the detector exceeds a threshold in one range out of a positive range and a negative range with respect to a reference value, the controller controls a radiation image capturing operation by determining that the radiation irradiation has started. The controller changes the threshold in accordance with the measured value of the other range out of the positive range and the negative range.

40 Claims, 12 Drawing Sheets

(56) References Cited

U.S. PATENT DOCUMENTS

| | | |
|---|---|---|
| 9,282,943 B2 * | 3/2016 | Oda .................... A61B 6/5258 |
| 9,360,562 B2 | 6/2016 | Sato et al. |
| 9,417,333 B2 | 8/2016 | Sato et al. |
| 2013/0032696 A1 | 2/2013 | Tajima |
| 2014/0061488 A1 | 3/2014 | Sato et al. |
| 2014/0061492 A1 | 3/2014 | Sato et al. |
| 2014/0061494 A1 | 3/2014 | Sato et al. |
| 2014/0061495 A1 | 3/2014 | Yagi et al. |
| 2014/0320685 A1 | 10/2014 | Takenaka et al. |

* cited by examiner

RADIATION IMAGING APPARATUS, RADIATION IMAGING SYSTEM, AND IRRADIATION START DETECTION METHOD

CROSS REFERENCE TO RELATED APPLICATIONS

This application is a continuation of U.S. patent application Ser. No. 15/182,863, filed on Jun. 15, 2016, which claims the benefit of and priority to Japanese Patent Application No. 2015-122115, filed on Jun. 17, 2015, respectively, the entire contents of each of which are hereby incorporated by reference herein in their entireties.

BACKGROUND OF THE INVENTION

Field of the Invention

The present invention relates to a radiation imaging apparatus, a radiation imaging system, and an irradiation start detection method.

Description of the Related Art

There is known a radiation imaging apparatus that electrically captures an optical image formed by radiation such as X-rays. The method of the radiation imaging apparatus can be largely divided into a direct method in which radiation is directly converted into an electrical signal and an indirect method in which radiation is converted into light by a scintillator and the light is converted into an electrical signal. In either method, the radiation image capturing operation needs to be performed in synchronization with the start of radiation irradiation. As a method of synchronization, there is a method in which a synchronization signal is transmitted from a control device of a radiation source to the radiation imaging apparatus and a method in which the radiation imaging apparatus detects the radiation with which it has been irradiated. Japanese Patent Laid-Open No. 2014-23957 discloses a radiation imaging apparatus that detects the start of radiation irradiation based on an electrical signal arising from charges generated in a sensor unit.

In a method in which the radiation imaging apparatus detects the radiation with which it has been irradiated to detect the start of radiation irradiation, an error can occur if large noise is included in a signal that has sensitivity to the emitted radiation.

SUMMARY OF THE INVENTION

The present invention provides a technique advantageous in preventing and reducing detection errors.

One of aspects of the present invention provides a radiation imaging apparatus that includes a pixel array including a plurality of pixels configured to detect radiation, a detector configured to detect radiation irradiation, and a controller, wherein in a case in which a measured value obtained by using the detector exceeds a threshold in one range out of a positive range and a negative range with respect to a reference value, the controller controls a radiation image capturing operation by determining that the radiation irradiation has started, and the controller changes the threshold in accordance with the measured value of the other range out of the positive range and the negative range.

Further features of the present invention will become apparent from the following description of exemplary embodiments with reference to the attached drawings.

DESCRIPTION OF THE EMBODIMENTS

Exemplary embodiments of the present invention will be described below with reference to the accompanying drawings.

First Embodiment

Figure 1:
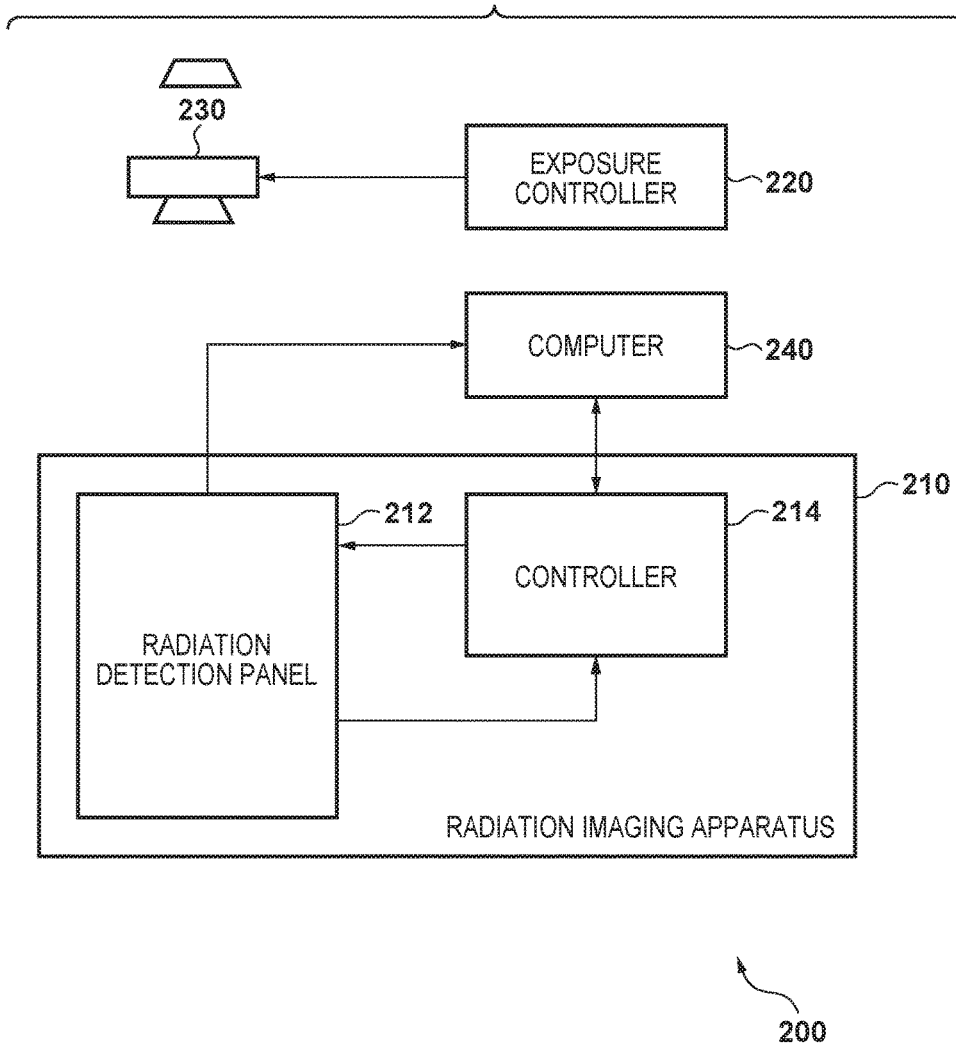
FIG. 1 is a block diagram showing the arrangement of a radiation imaging system according to an embodiment of the present invention.

FIG. 1 shows the arrangement of a radiation imaging system 200 according to the first embodiment of the present invention. The radiation imaging system 200 is arranged so as to electrically capture an optical image formed by radiation and obtain an electrical radiation image (that is, radiation image data). The radiation typically can be, for example, X-rays but also may be α-rays, β-rays, or γ-rays. The radiation imaging system 200 can include, for example, a radiation imaging apparatus 210, a radiation source 230, an exposure controller 220, and a computer 240. The radiation source 230 starts radiation emission in accordance with an exposure instruction (emission instruction) from the exposure controller 220. Radiation emitted from the radiation source 230 passes through an object (not shown) and irradiates the radiation imaging apparatus 210.

The radiation imaging apparatus 210 includes a radiation detection panel 212 and a controller 214 that controls the radiation detection panel 212. The controller 214 can be, for example, formed by a PLD (Programmable Logic Device) such as an FPGA (Field Programmable Gate Array), an ASIC (Application Specific Integrated Circuit), a general computer embedded with a program, or a combination of all or some of these components. The controller 214 can include a sample and hold circuit or an analog circuit such as an operational amplifier.

The controller 214 controls the radiation detection panel 212 and processes each signal output from the radiation detection panel 212. When a value of a detection signal output from the radiation detection panel 212 or a measured value which is a value obtained by processing the detection signal exceeds a threshold, the controller 214 determines that radiation irradiation has started and causes the radiation detection panel 212 to start a radiation image capturing operation.

Figure 2:
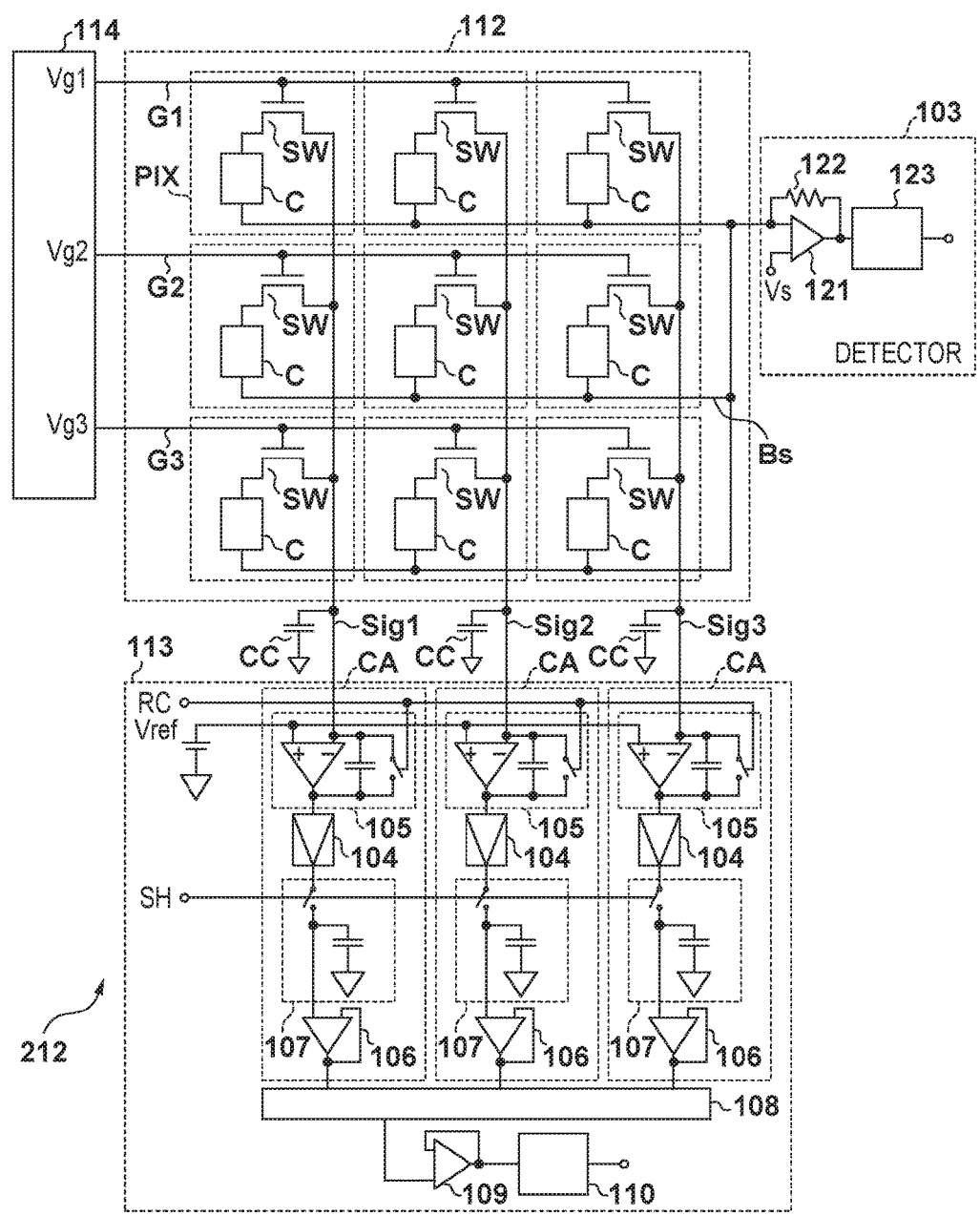
FIG. 2 is a block diagram showing the arrangement of a radiation detection panel according to the embodiment of the present invention.

FIG. 2 shows an example of the arrangement of the radiation detection panel 212. The radiation detection panel 212 includes a pixel array 112. The pixel array 112 includes a plurality of pixels PIX that detect radiation and a plurality of signal lines Sig (Sig1 to Sig3). Note that, for the sake of descriptive convenience, the pixel array 112 is constituted by 3 rows×3 columns of pixels PIX in FIG. 2. In practice, however, a larger number of pixels PIX can be arranged. In one example, the radiation detection panel 212 can have a dimension of 17 inches and include approximately 3,000 rows×3,000 columns of pixels PIX.

The radiation detection panel 212 includes a driving circuit (row selecting circuit) 114 that drives the pixel array 112, a readout unit (reader or readout circuit) 113 that detects signals that appear in the plurality of column signal lines Sig of the pixel array 112, and a detector 103 that detects radiation irradiation. In this example, the detector 103 also serves as a bias circuit that provides, via a bias line Bs (electrically conductive line), a bias voltage Vs to all or some of the plurality of pixels PIX forming the pixel array 112.

The detector 103 also serving as the bias circuit can include a differential amplifier 121 and a feedback resistance 122 connected between the first input terminal of the differential amplifier 121 and the output terminal of the differential amplifier 121. A bias voltage Vs (predetermined value) is supplied to the second input terminal of the differential amplifier 121. The first and second input terminals of the differential amplifier 121 are virtually short-circuited and become the same voltage. Therefore, the voltage of the bias line Bs is driven to the bias voltage Vs by the differential amplifier 121. A current flowing in the bias line Bs, that is, a voltage corresponding to the electrical signal that appears in the bias line BS is output to the output terminal of the differential amplifier 121. The current flowing in the bias line Bs is a signal that has sensitivity to radiation irradiation.

When the radiation detection panel 212 (pixel array 112) is irradiated with radiation, a current corresponding to the radiation flows in the bias line Bs. As a result, an electrical signal correlated with the radiation irradiation amount to the pixel array 112 appears in the output terminal of the differential amplifier 121. The detector 103 can include an AD converter 123 that AD-converts a signal output to the output terminal of the differential amplifier 121. Although the signal output from the AD converter 123 of the detector 103 and supplied to the controller 214 is referred to as a detection signal hereinafter, the signal output to the output terminal of the differential amplifier 121 can also be understood to be a detection signal. In addition, an amplification circuit and/or a circuit such as a filter can be arranged between the differential amplifier 121 and the AD converter 123. The AD converter 123 can be provided in the controller 214.

The detector 103 detects radiation irradiation to the pixel array 112 by detecting the current flowing in the bias line Bs. However, the present invention is not only limited to this one example. Radiation irradiation to the pixel array 112 can be detected by detecting the voltage of the column signal lines Sig or the current flowing in the column signal lines Sig. Alternatively, radiation irradiation to the pixel array 112 can be detected by reading out signals from some of the plurality of pixels PIX by the readout unit 113. Alternatively, a dedicated radiation detection sensor can be arranged inside the pixel array 112 or outside the pixel array 112 and radiation irradiation to the pixel array 112 can be detected by the radiation detection sensor.

Each pixel PIX includes a conversion element C that detects radiation and a switch SW that connects the conversion element C and a column signal line Sig (a column signal line Sig corresponding to the conversion element C out of the plurality of column signal lines Sig). The conversion element C outputs a signal corresponding to its incident radiation amount to the signal line Sig. The conversion element C can include, for example, a MIS photodiode mainly made of amorphous silicon and arranged on an insulating substrate such as a glass substrate. Alternatively, the conversion element C can include a PIN photodiode. The conversion element C can be formed as a direct conversion element which directly converts the radiation into an electrical signal or as an indirect conversion element which converts the radiation into light and detects the light. In the case of the indirect conversion element, a scintillator can be shared by the plurality of pixels PIX.

Each switch SW can be formed, for example, from a transistor such as a thin film transistor (TFT) which includes a control terminal (gate) and two main terminals (source and drain). Each conversion element C includes two main electrodes. One main electrode of the conversion element C is connected to one of the two main terminals of the switch SW and the other main electrode of the conversion element C is connected to the bias line BS. The control terminal of the switch SW of each first row pixel PIX is connected to a gate line G1, the control terminal of the switch SW of each second row pixel PIX is connected to a gate line G2, and the control terminal of the switch SW of each third row pixel PIX is connected to a gate line G3. Gate signals Vg1, Vg2, Vg3 . . . are supplied to the gate lines G1, G2, G3 . . . , respectively, by the driving circuit 114.

In each first column pixel PIX, one main terminal of the switch SW is connected to the first column signal line Sig1. In each second column pixel PIX, one main terminal of the switch SW is connected to the second column signal line Sig2. In each third column pixel PIX, one main terminal of the switch SW is connected to the third column signal line Sig3. Each column signal line Sig (Sig1, Sig2, Sig3 . . . ) has a capacitance CC.

The readout unit 113 includes a plurality of column amplifying units CA so that one column amplifying unit CA corresponds to one column signal line Sig. Each column amplifying unit CA can include, for example, an integration amplifier 105, a variable amplifier 104, a sample and hold circuit 107, and a buffer circuit 106. The integration amplifier 105 amplifies each signal that appears in the corresponding signal line Sig. The integration amplifier 105 can include, for example, an operational amplifier and an integral capacitor and a reset switch connected in parallel between the inverting input terminal and the output terminal of the operational amplifier. A reference voltage Vref is supplied to the non-inverting input terminal of the operational amplifier. The reset switch is turned on when a reset signal RC driven by the controller 214 is activated. This causes the voltage of each column signal line Sig to be reset to the reference voltage Vref together with the resetting of the integral capacitor.

The variable amplifier 104 performs amplification by a set amplification factor from the integration amplifier 105. The sample and hold circuit 107 samples and holds a signal from the variable amplifier 104 when a sample and hold signal SH which is driven by the controller 214 is activated. The sample and hold circuit 107 can be constituted by, for example, a sampling switch and a sampling capacitor. The buffer circuit 106 buffers (impedance-converts) the signal from the sample and hold circuit 107 and outputs the signal. The sampling switch can be controlled by a sampling pulse supplied from the controller 214.

The readout unit 113 also includes a multiplexer 108 that selects and outputs, in a predetermined order, the signals from the plurality of column amplifying units CA provided so as to correspond with the plurality of column signal lines Sig, respectively. The multiplexer 108 includes, for example, a shift register. The shift register performs a shift operation in accordance with a clock signal supplied from the controller 214 and selects a signal out of the plurality of column amplifying units CA. The readout unit 113 can also include, for example, a buffer 109 which buffers (impedance-converts) the signal output from the multiplexer 108 and an AD converter 110 which converts an analog signal, as the output signal from the buffer 109, into a digital signal. The output of the AD converter 110, that is, the radiation image data is supplied to the computer 240.

The operation of the radiation imaging apparatus 210 includes an initialization operation, an accumulation operation, and a readout operation. The initialization operation is an operation to initialize the plurality of pixels PIX of the pixel array 112 on a row basis. The accumulation operation is an operation to accumulate charges generated in each pixel PIX of the pixel array 112 by radiation irradiation. The readout operation is an operation to read out, from the pixel array 112, a signal corresponding to the charges accumulated in each pixel PIX of the pixel array 112 when the pixel array 112 is irradiated with radiation and output each signal as an image (image signal).

The operation shifts from the initialization operation to the accumulation operation when the controller 214 determines that radiation irradiation to the radiation imaging apparatus 210 has started based on the detection signal output from the detector 103. The operation shifts from the accumulation operation to the readout operation when, for example, a predetermined time has passed from the start of the accumulation operation.

Figure 3:
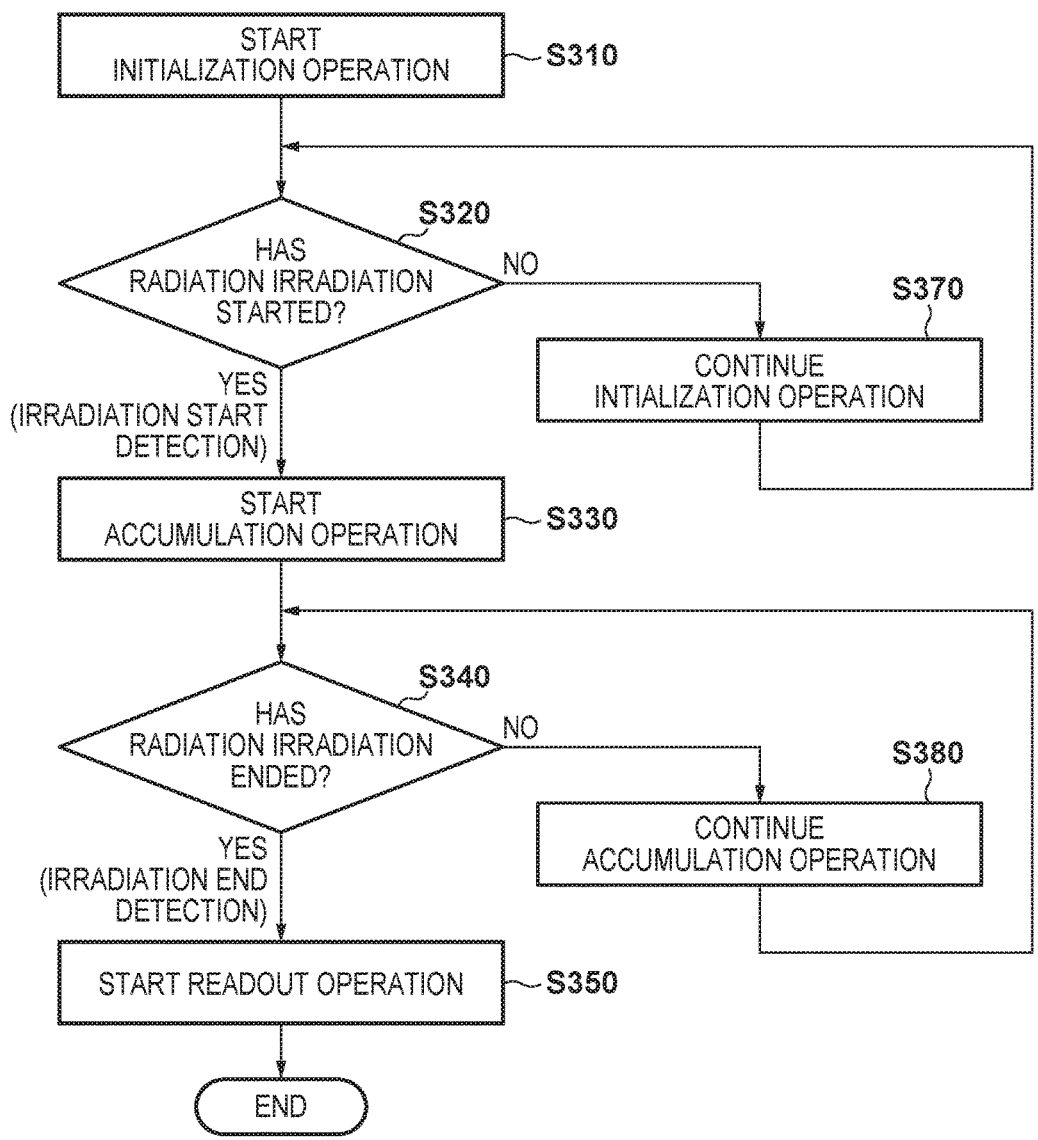
FIG. 3 is a flowchart for explaining the operation of a radiation imaging apparatus according to the embodiment of the present invention.
Figure 4:
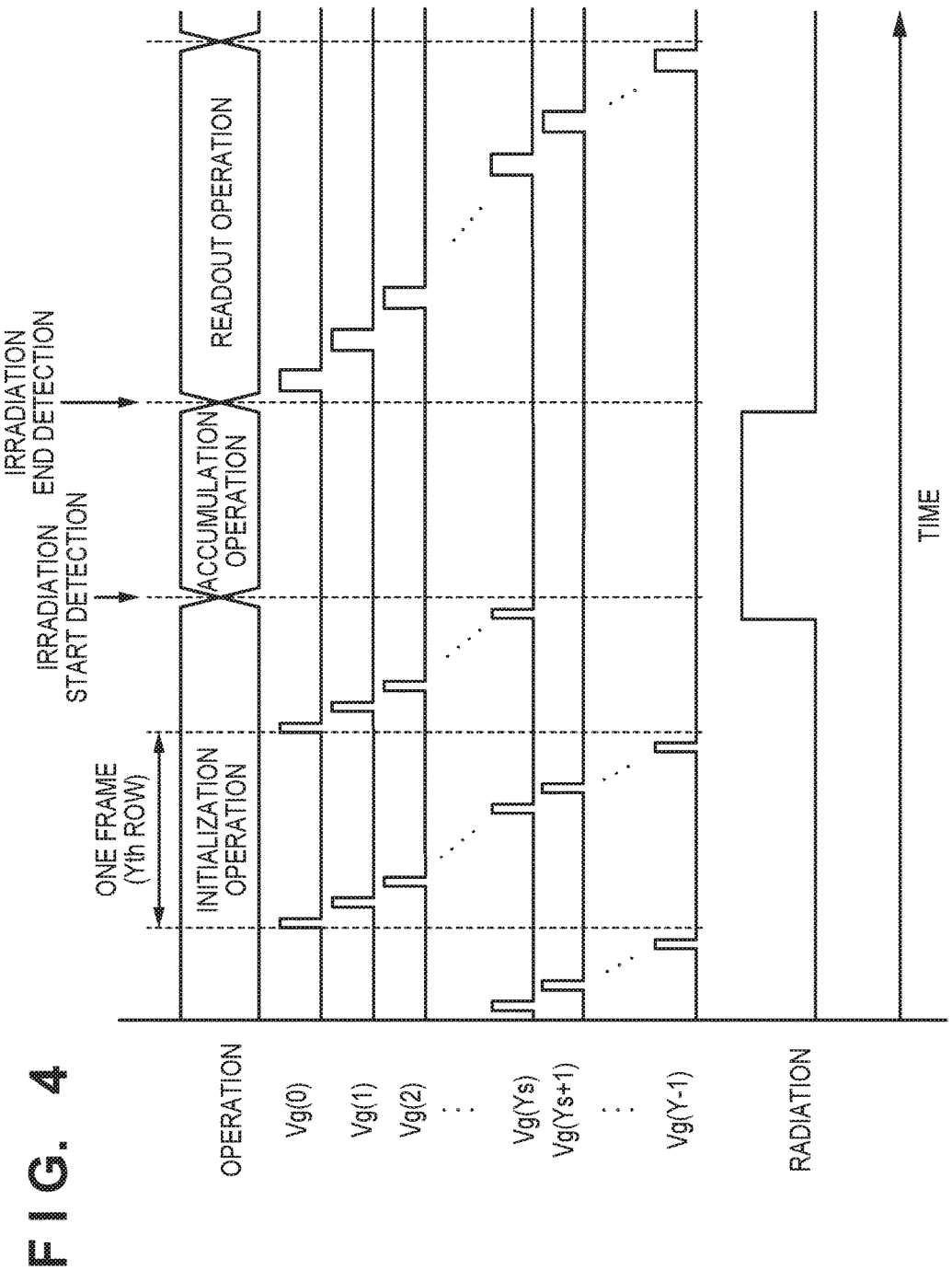
FIG. 4 is a timing chart for explaining the operation of the radiation imaging apparatus according to the embodiment of the present invention.

The operation of the radiation imaging apparatus 210 will be described with reference to FIGS. 3 and 4. The controller 214 starts the initialization operation in step S310. The controller 214 repeats the operation of sequentially setting the gate lines G (G1, G2, G3 . . . ) from the first row to the last row to active level and setting the reset signal RC to active level in the initialization operation. When the reset signal RC is set to active level, each integration amplifier 105 changes to a voltage follower state and the reference voltage Vref is supplied to the corresponding column signal line Sig. In this state, each switch SW corresponding to the row that the gate line G has been set to active level becomes electrically conductive and charges accumulated in a capacitance Cs of each conversion element C are initialized. In FIG. 4, Vg(0), Vg(1), Vg(2), . . . , Vg(Y), Vg(Ys), Vg(Ys+1), . . . , Vg(Y−1) indicate driving signals supplied to the gate lines G from the first row to the last row of the pixel array 112, respectively.

In the initialization operation period, the detector 103 outputs a detection signal correlated with the radiation irradiation amount to the pixel array 112. In step S320, during the initialization operation, the controller 214 determines whether radiation irradiation has started. More specifically, the controller 214 determines whether radiation irradiation to the pixel array 112 has been started based on the detection signal output from the detector 103.

The controller 214 continues the initialization operation (step S370) until it determines that radiation irradiation to the pixel array 112 has started. Upon determining the start of radiation irradiation to the pixel array 112 (YES in step S320), the controller 214 starts the accumulation operation in step S330. That is, when the start of radiation irradiation is detected (indicated as "irradiation start detection" in FIG. 4), the initialization operation shifts to the accumulation operation. The process of step S320 will be described later.

During the accumulation operation, the controller 214 determines in step S340 whether radiation irradiation has ended. Although the method of determining the end of radiation irradiation is not particularly limited, the end of radiation irradiation can be determined, for example, in accordance with the lapse of a predetermined time since the start of the accumulation operation. Alternatively, the controller 214 can determine that radiation irradiation to the pixel array 112 has ended based on, for example, at least one of an instantaneous value, an integral value, and a differential value of the detection signal output from the detector 103.

The controller 214 continues the accumulation operation (step S380) until it determines that radiation irradiation to the pixel array 112 has ended. Upon determining the end of radiation irradiation to the pixel array 112 (YES in step S340), the controller 214 starts the readout operation in step S350. That is, when the end of radiation irradiation is determined (indicated as "irradiation stop detection" in FIG. 4), the accumulation operation shifts to the readout operation. The signals from the first row pixels to the last row pixels of the pixel array 112 are sequentially read out in the readout operation.

Figure 5:
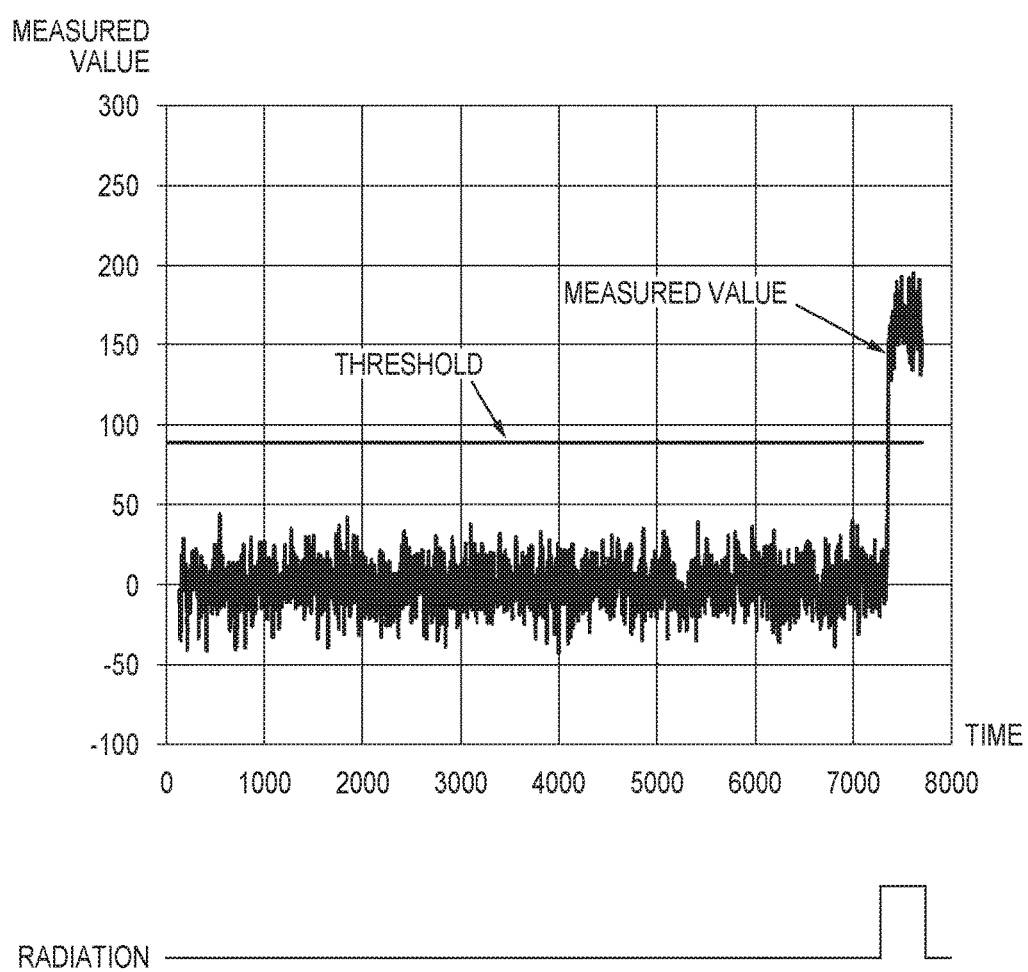
FIG. 5 is a view for explaining the detection of the start of radiation irradiation in a comparative example.
Figure 6:
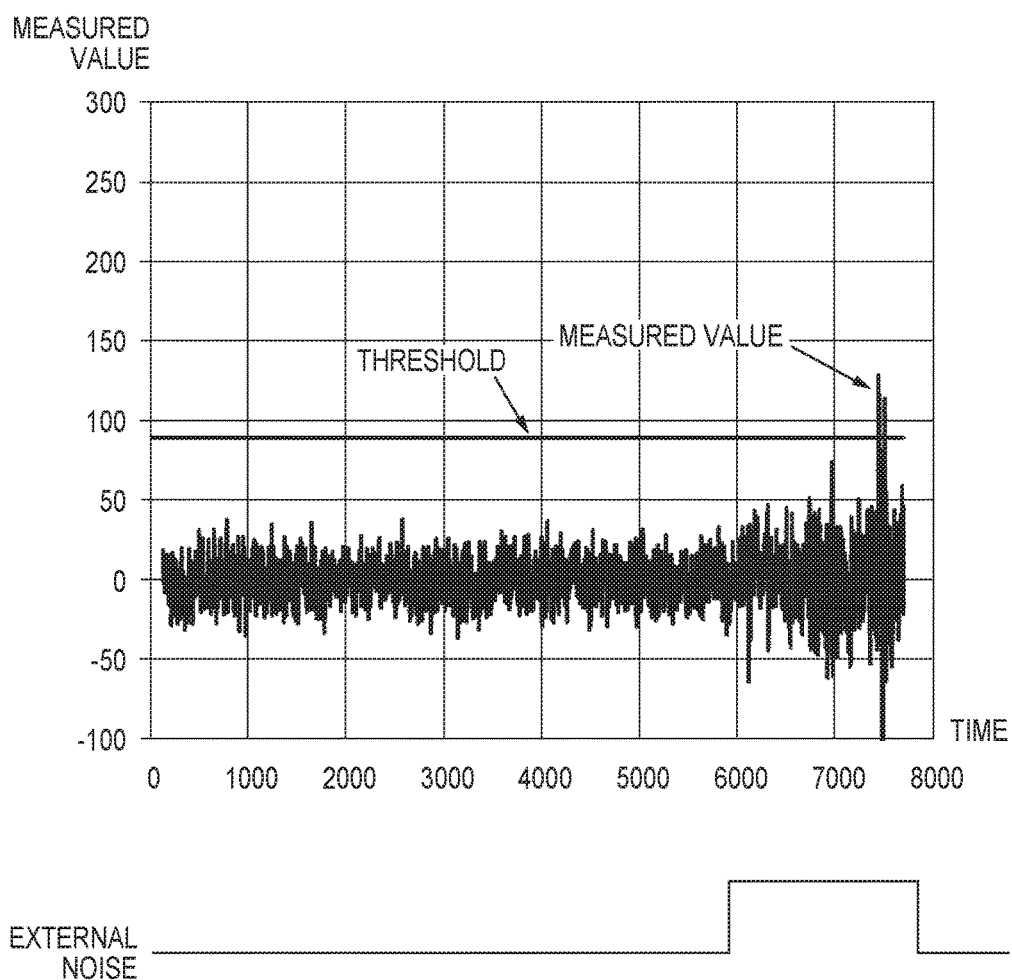
FIG. 6 is a view for explaining the detection of the start of radiation irradiation in the comparative example.

FIGS. 5 and 6 show the detection of the start of radiation irradiation in a comparative example. FIG. 5 shows the operation when system noise is included in the measured value that can be obtained by the controller 214 by using the detector 103. FIG. 6 shows the operation when external noise, other than the system noise, is included in the measured value that can be obtained by the controller 214 by using the detector 103. The measured value is a value of the detection signal output from the detector 103 of the radiation detection panel 212 or a value that can be obtained by processing the detection signal. In this case, the value that can be obtained by processing the detection signal output from the detector 103 can be, for example, a value that can be obtained by the controller 214 by performing processing (for example, amplification, filtering, integral operation, moving average operation, or the like) on the detection signal output from the detector 103. Alternatively, the value that can be obtained from processing the detection signal output from the detector 103 can be a value that another unit (not shown) can obtain by processing the detection signal output from the detector 103.

When the radiation imaging apparatus 210 is irradiated with radiation, the current flows in the bias line Bs. The measured value which can be obtained by using the detector 103 is information correlated with the current flowing in the bias line Bs. If the measured value exceeds the threshold, the controller 214 determines in step S320 that radiation irradiation to the radiation imaging apparatus 210 has started. However, random noise can be included in the measured value even when there is no radiation irradiation to the radiation imaging apparatus 210. This noise is the system noise. For example, letting σ be the standard deviation of the system noise, the threshold is set to be equal to or more than 80. As exemplified in FIG. 5, if no external noise is present, the start of radiation irradiation can be detected without a problem by setting the threshold to be about 80 of the system noise.

However, if external noise is present as exemplified in FIG. 6, the measured value will exceed the threshold due to the external noise and start of radiation irradiation can be determined even when radiation irradiation has not started. This will be called error detection. When error detection occurs, the operation will shift to the accumulation operation (step S330) and it will become a state in which no radiation image can be captured until the initialization operation is started again. This state can take, for example, about several seconds. Therefore, an error-detection occurring radiation imaging apparatus is inconvenient to use. On the other hand, it becomes difficult to detect weak radiation if the threshold is increased. The following can be considered representative sources of external noise in a site of medical care.

A device (for example, a cathode ray tube (CRT) or the like) generating electromagnetic waves approaching the radiation imaging apparatus Turning ON/OFF the power supply of a device (for example, the radiation source)

Driving a motor (for example, an electrical surgical drill, a motor for a rotating anode of the radiation source, or the like)

A strong impact (for example, a collision)

For example, in some types of radiation sources, the anode in the radiation tube begins to rotate in response to a switch being pressed, and error detection can occur when the measured value exceeds the threshold due to the electromagnetic waves generated at that time. In such a case, normal imaging may be impossible since radiation irradiation will be performed immediately after error detection.

Figure 7:
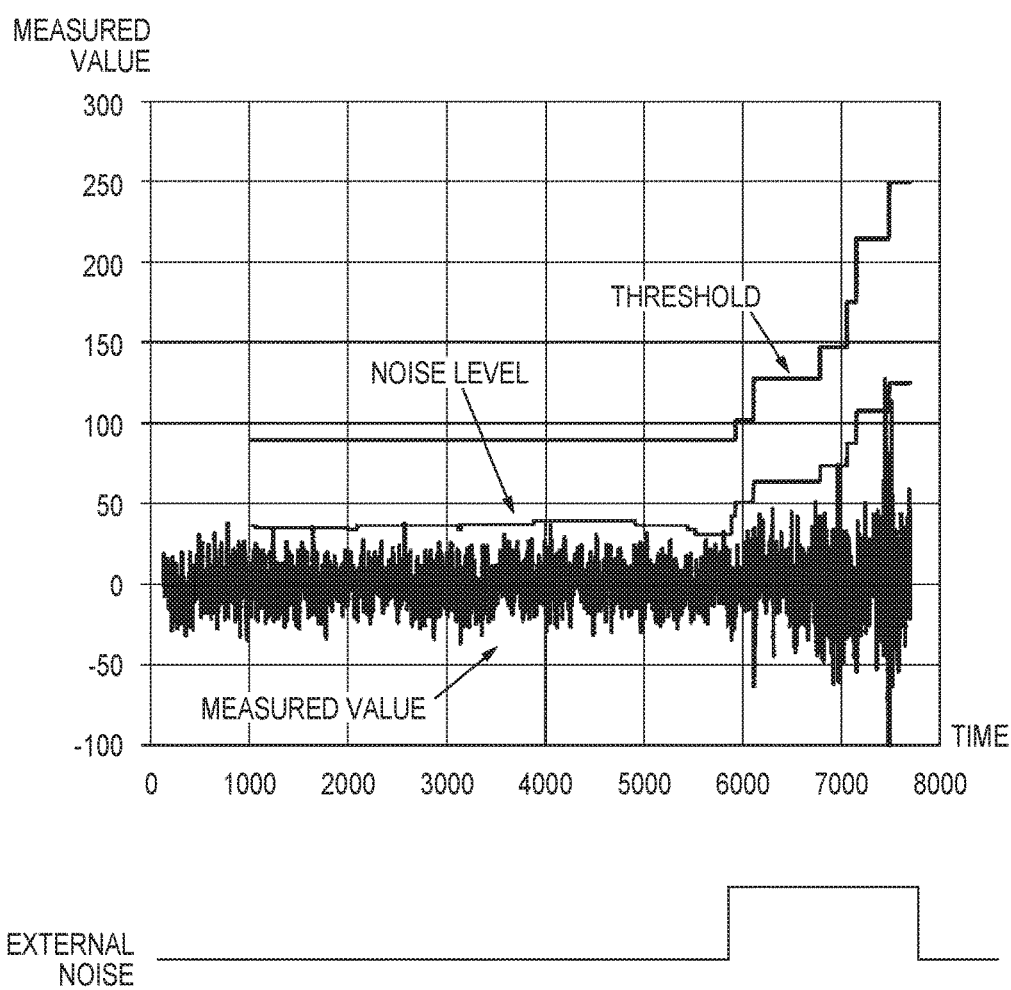
FIG. 7 is a view for explaining the detection of the start of radiation irradiation in the radiation imaging apparatus according to the embodiment of the present invention.
Figure 8:
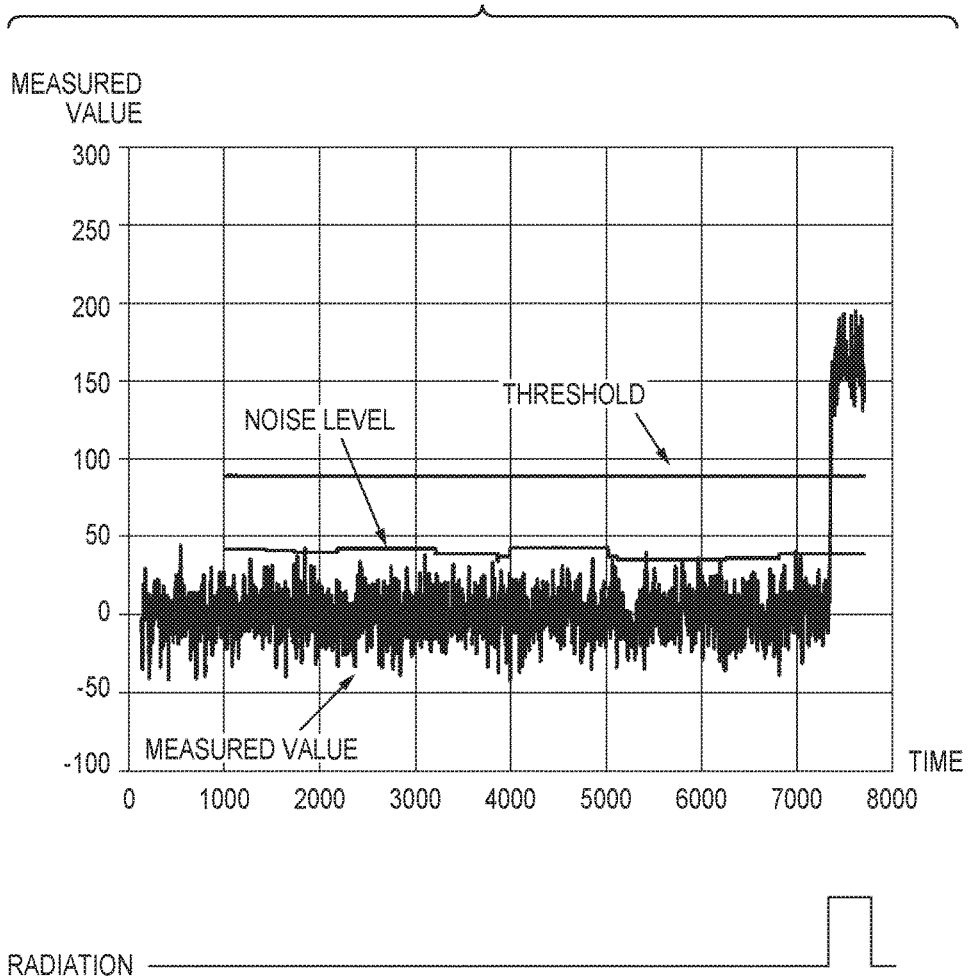
FIG. 8 is a view for explaining the detection of the start of radiation irradiation in the radiation imaging apparatus according to the embodiment of the present invention.

The principle of a method (irradiation start detection method) of detecting the start of radiation irradiation in the radiation imaging apparatus 210 according to the first embodiment of the present invention will be described below with reference to FIGS. 7 and 8. A measured value, that is, a value of a detection signal output from the detector 103 or a value obtained from processing the detection signal has the following characteristics.

When the radiation imaging apparatus is irradiated with radiation, the measured value changes so that the difference from a reference value in one range, out of the positive range and the negative range with respect to the reference value, becomes large.

When external noise is added, the measured value changes in both the positive range and the negative range with respect to the reference value.

The waveform of the external noise in the positive range with respect to the reference value and the waveform of the external noise in the negative range with respect to the reference value are almost symmetrical.

In this case, assume that the reference value is, for example, 0 (zero). In addition, the average value of system noise is typically 0 (zero). In each example shown in FIGS. 7 and 8, when the radiation imaging apparatus is irradiated with radiation, the measured value changes so that the difference from the reference value is large in the positive range with respect to the reference value (0). Conversely, the detector 103 or the controller 214 can be arranged so that the difference between the reference value and the measured value becomes large in the negative range with respect to the reference value (0) when the radiation imaging apparatus is irradiated with radiation.

In the arrangement in which the measured value difference from the reference value becomes large in one range out of the positive range and the negative range with respect to the reference value upon receiving radiation irradiation, the controller 214 changes the threshold in accordance with the measured value of the other range out of the positive range and the negative range. For example, in an arrangement in which the difference between the measured value and the reference becomes large in the positive range with respect to the reference value upon receiving radiation irradiation, the controller 214 changes the threshold in accordance with the measured value in the negative range. In an arrangement in which the difference between the measured value and the reference value becomes large in the negative range with respect to the reference value upon receiving radiation irradiation, the controller 214 changes the threshold in accordance with the measured value in the positive range.

In this case, assume that "one range" is to be referred to as a "monitoring range" and "the other range" is to be referred to as a "noise evaluating range". The controller 214 changes the threshold based on the measured value of the noise evaluating range and determines that radiation irradiation has been performed when the measured value of the monitoring range exceeds the threshold. In the examples shown in FIGS. 7 and 8, a range in which the measured value indicates a positive value is the monitoring range and a range in which the measured value indicates a negative value is the noise evaluating range.

In one example, the controller 214 estimates the noise level included in the measured value based on the envelope of the measured value in the noise evaluating range. According to this method, even if the measured value becomes large due to the addition of external noise as exemplified in FIG. 7, no error detection occurs since the threshold becomes large accordingly. If there is no addition of external noise, the controller 214 does not change the threshold, as exemplified in FIG. 8. Therefore, whether external noise is added or not, error detection can be prevented and the start of radiation irradiation can be detected accurately.

An example of threshold change by the controller 214 will be described with reference to FIG. 9. In this example, the controller 214 estimates (determines) the noise level included in the measured value based on the maximum value (envelope) of the measured values in the noise evaluating range and changes the threshold according to this noise level. Three examples of noise level estimation method will be described below.

Figure 9:
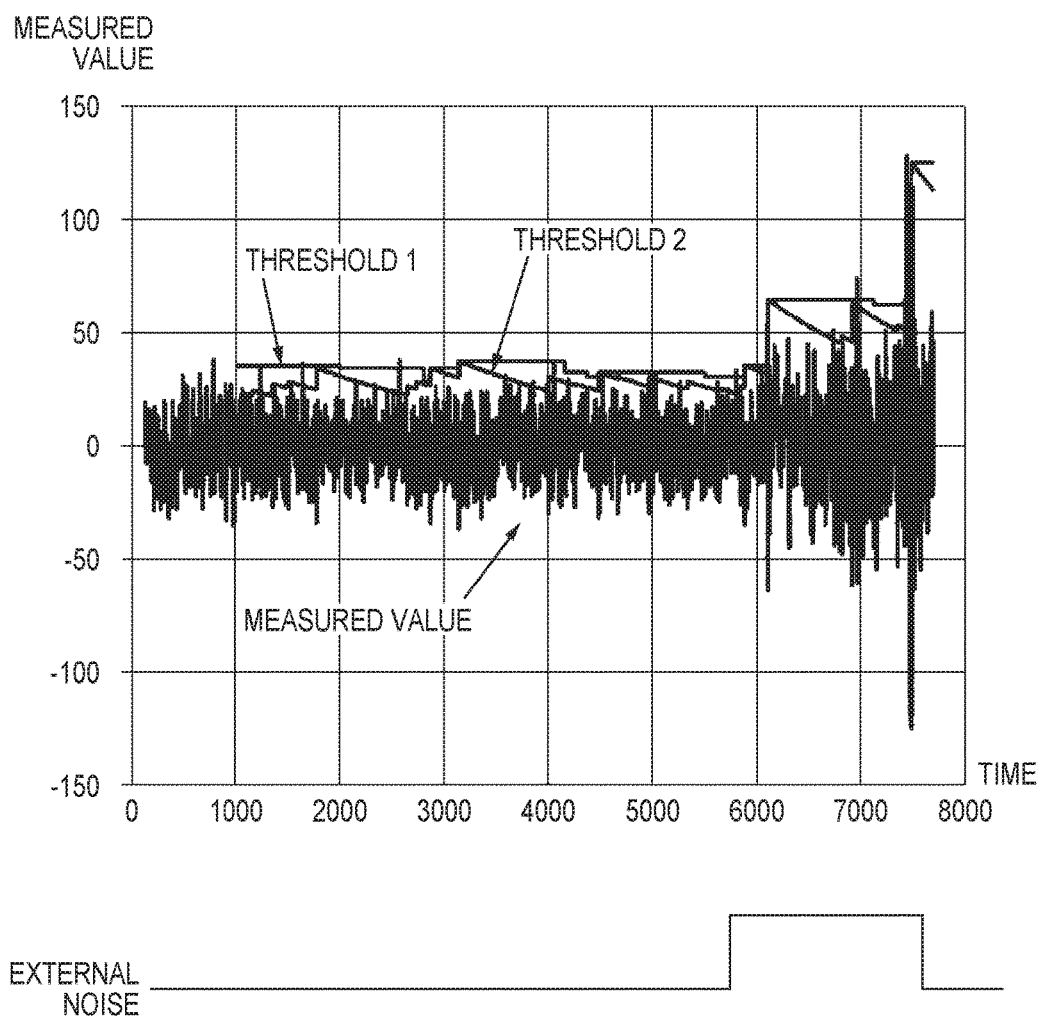
FIG. 9 is a view for explaining the detection of the start of radiation irradiation in the radiation imaging apparatus according to the embodiment of the present invention.

The first method of noise level estimation uses the maximum value of the amplitude (absolute value) of a plurality of measured values in the noise evaluating region (a range in which the measured values are negative in FIG. 9). A noise level A(t) of time t is given by:

$$A(t) = \max\{-V(t), -V(t-1), \ldots, -V(t-n-1)\} \quad (1)$$

where V(t) represents a measured value in the noise evaluating range at time t and n represents an interval to calculate the maximum value.

In the second method of noise level estimation, a noise level A(t) at time t is given by:

$$A(t)=\max\{-V(t), A(t-1)*\alpha\} \quad (2)$$

where V(t) represents a measured value in the noise evaluating range at time t, A(t−1) represents a past noise level, and α(α<1) represents a constant value.

In the third method of noise level estimation, a noise level A(t) at time t is given by:

$$A(t)=\max\{-V(t), A(t-1)-\beta\} \quad (3)$$

where V(t) represents a measured value in the noise evaluating range at time t, A(t−1) represents a past noise level, and β(β>0) represents a constant value.

The method of noise level estimation (determination) is not limited to the above-described first, second, and third methods and may employ another method.

Next, an example of the method by which the controller 214 determines a threshold T'(t+Δt) at time t+Δt based on a noise level A(t) at time t will be described. External noise and system noise are included in the noise level. Therefore, a noise level A(t) is given by:

$$A(t)=Ae(t)+Ai(t) \quad (4)$$

where Ae(t) represents an external noise level and Ai(t) represents a system noise level.

Letting σ be the standard deviation of system noise, the system noise level Ai(t) can be about 3σ to 4σ. This value is constant regardless of time. That is, the value obtained by subtracting Ai(t)=3σ to 4σ from A(t) can be considered to be the external noise level Ae(t). In this example, however, the external noise level will never be a negative value. That is, an external noise level is given by:

$$Ae(t)=\max\{A(t)-Ai,0\} \quad (5)$$

The threshold T'(t) at time t+Δt needs to be set to be a value in which error detection, due to system noise or external noise, does not occur. Letting T be the threshold when there is no presence of external noise, a threshold T'(t+Δt) preferably holds:

$$T'(t+\Delta t)=k*Ae(t)+T \quad (6)$$

where k represents a safety factor. If the safety factor k is increased, although error detection resistance will improve, the detection capability can decrease more easily upon application of external noise. Therefore, it is preferable for the safety factor k to be adjustable. That is, the equation preferably has an arrangement in which a new threshold is given by the sum of a value obtained by multiplying the external noise level by the safety factor k and a predetermined threshold T. By setting the threshold T'(t+Δt) in this manner, error detection due to external noise can be suppressed and the start of radiation irradiation can be accurately detected.

The method of determining the threshold T'(t+Δt) is not limited to the method according to equation (6). For example, the noise level A(t) itself can be used as the threshold T'(t+Δt). Alternatively, an upper limit and a lower limit may be set for the threshold T'(t+Δt). That is, the controller 214 can be configured to change the threshold within a predetermined range.

The second embodiment of the present invention will be described below as a modification of the first embodiment of the present invention. Note that matters not mentioned can follow the first embodiment.

Figure 10:
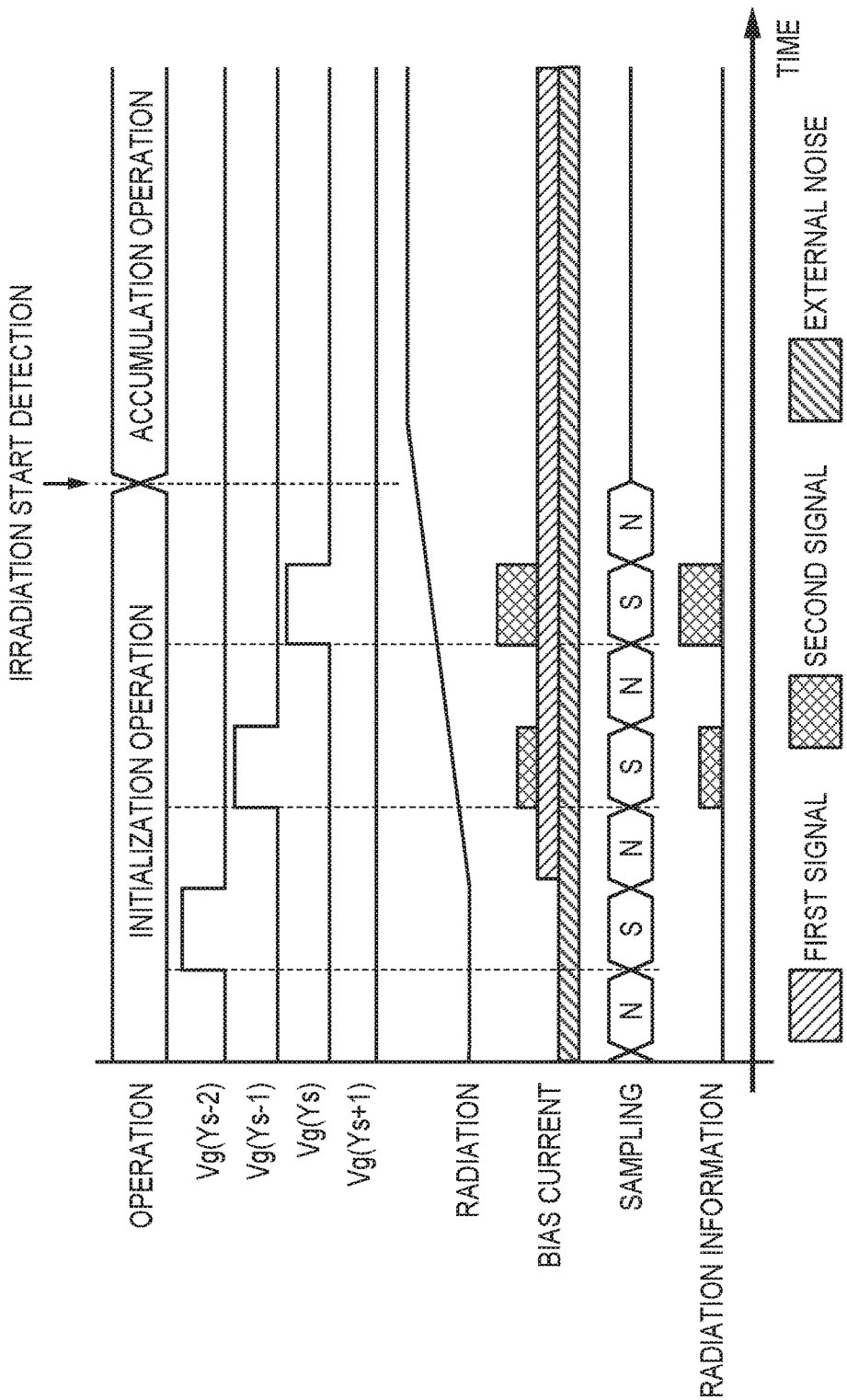
FIG. 10 is a timing chart for explaining the second embodiment of the present invention.

FIG. 10 exemplifies the operations of the detector 103 which detects radiation irradiation and the controller 214. In FIG. 10, Vg(Ys−2), Vg(Ys−1), Vg(Ys), and Vg(Ys+1) represent driving signals supplied to a (Ys−2)th row gate line G to a (Ys+1)th row gate line G, respectively, of a pixel array 112.

A radiation imaging apparatus 210 can have the following features in relation to the current flowing in the bias line Bs.

(1) A current proportional to the radiation irradiation amount per unit time flows in the bias line Bs regardless of whether a switch SW of a pixel PIX is electrically conductive or not during radiation irradiation. This current is indicated as the "first signal" in FIG. 10.

(2) When the switch SW of the pixel PIX irradiated with radiation becomes electrically conductive, a current proportional to the amount of charges accumulated in a conversion element C of the pixel PIX until the switch SW becomes electrically conductive flows in the bias line Bs. This current is indicated as the "second signal" in FIG. 10.

(3) A current flows in the bias line Bs when switching electrical conductivity/non-conductivity of the switch SW of the pixel PIX. This current can be called switching noise.

(4) A current flows in the bias line Bs when an impact or a magnetic field is applied to the radiation imaging apparatus 210. This current can be called external noise and is indicated as "external noise" in FIG. 10.

(5) A current flows in the bias line Bs due to electromagnetic waves generated by the radiation imaging apparatus 210 itself or internal noise of the detector 103 even without application of a magnetic field or shock to the radiation imaging apparatus 210. This current can be called system noise.

In order to detect radiation irradiation, more specifically, the start of radiation irradiation, a detection signal value output from the detector 103 can be directly used as the measured value. However, in a case in which external noise due to the influence of shock or magnetic field cannot be ignored, a value obtained by processing the detection signal output from the detector 103 is preferably used as the measured value.

As shown in FIG. 10, S represents a sampled detection signal from the detector 103 which is correlated with the bias current flowing in the bias line Bs when the switch SW of the pixel PIX becomes electrically conductive. Additionally, N represents a sampled detection signal from the detector 103 which is correlated with the bias current flowing in the bias line Bs at the time when the switch SW becomes non-conductive. External noise can be removed by removing the difference between S and N. Since external noise varies with the lapse of time, however, it is preferable to use S and N sampled at times that are close to each other. That is, letting X(y) be a sample value (radiation information) in which external noise has been removed, X(y) can be given by:

$$X(y)=S(y)-\{N(y)+N(y-1)\}/2 \quad (7)$$

where S(y) represents yth sampled S, N(y) represents the yth sampled N. Equation (7) shows the calculation of difference between the detection signal from the detector 103 when the switch SW is electrically conductive and the detection signal from the detector 103 when the switch SW is not electrically conductive.

The method of reducing external noise in this manner is called CDS (Correlated Double Sampling) processing. CDS processing is one example of noise reduction processing. The calculation for CDS processing is not limited to the calculation method of equation (7). For example, either N(y) or N(y−1) can be used to calculate X(y). Sample values not adjacent to S(y−1) and N(y−2) can also be used to calculate X(y). As the yth sampled S(y), a value that has added sample values that have been sampled a plurality of times in the period can be used.

Figure 11:
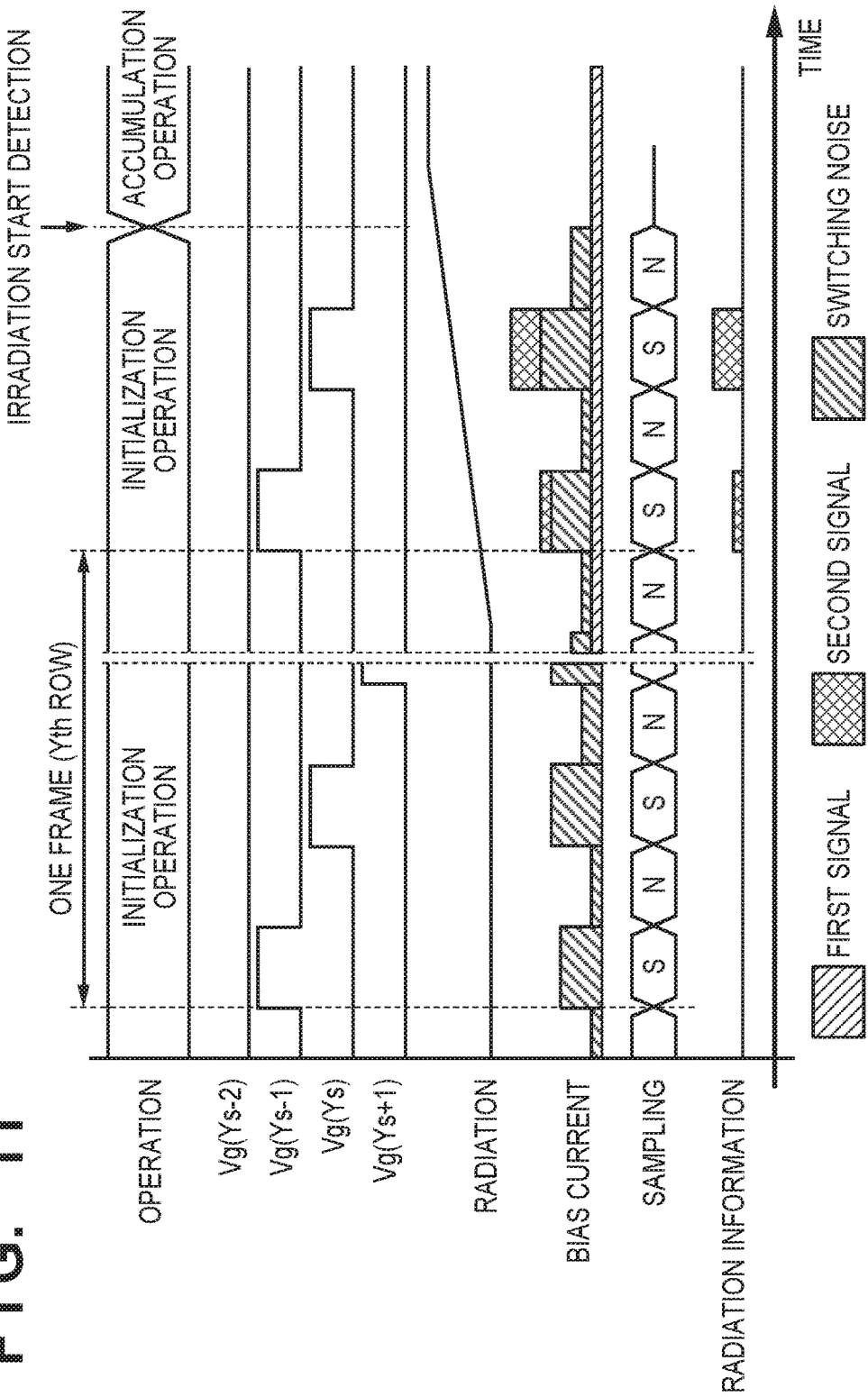
FIG. 11 is a timing chart for explaining the second embodiment of the present invention.

As exemplified in FIG. 11, there can be cases in which switching noise generated at the time when the switch SW is switched between conductive and non-conductive states. In such a case, it is preferable to process the detection signal from the detector 103 which is correlated with the bias current flowing in the bias line BS so that switching noise will be reduced. As the processing to reduce the switching noise, for example, there is processing to subtract a value of switching noise sampled beforehand from the value of the detection signal of the detector 103.

In this case, although the magnitude of the switching noise varies for each row, it has been confirmed that the magnitude of the switching noise of the same row has high reproducibility. Hence, as shown in FIG. 11, by subtracting the bias current value of a preceding frame of the same row from the current bias current value, the switching noise can be effectively reduced. Letting Y be the number of rows in the pixel array 112, S(y−Y) be S of one preceding frame, and N(y−Y) be N of one preceding frame, X(y) can be given by:

$$X(y)=[S(y)-\{N(y)+N(y-1)\}/2]-[S(y-Y)-\{N(y-Y)+N(y-1-Y)\}/2] \quad (8)$$

The first term of equation (8) indicates the calculation of the difference between the detection signal of the detector 103 when the switch SW is electrically conductive and the detection signal of the detector 103 when the switch SW is not electrically conductive for the yth row. The second term of equation (8) indicates the calculation of the difference between the detection signal of the detector 103 when the switch SW is electrically conductive and the detection signal of the detector 103 when the switch SW is not electrically conductive for the yth row of one preceding frame. The entire equation (8) indicates that a difference between the latest difference and a preceding difference in the same row will be obtained.

The method of reducing switching noise in this manner can be called frame correction. The calculation of frame correction is not limited to the calculation method of equation (8). For example, S and N of k preceding frames (k>1) can be used. The calculation can be performed by using only S or N. Note that if CDS is unnecessary, frame correction can be performed without performing CDS.

Other than using X(y), obtained by removing noise through such signal processing, in place of the aforementioned V(t), the start of radiation irradiation can be detected by the same method as in the first embodiment.

Figure 12:
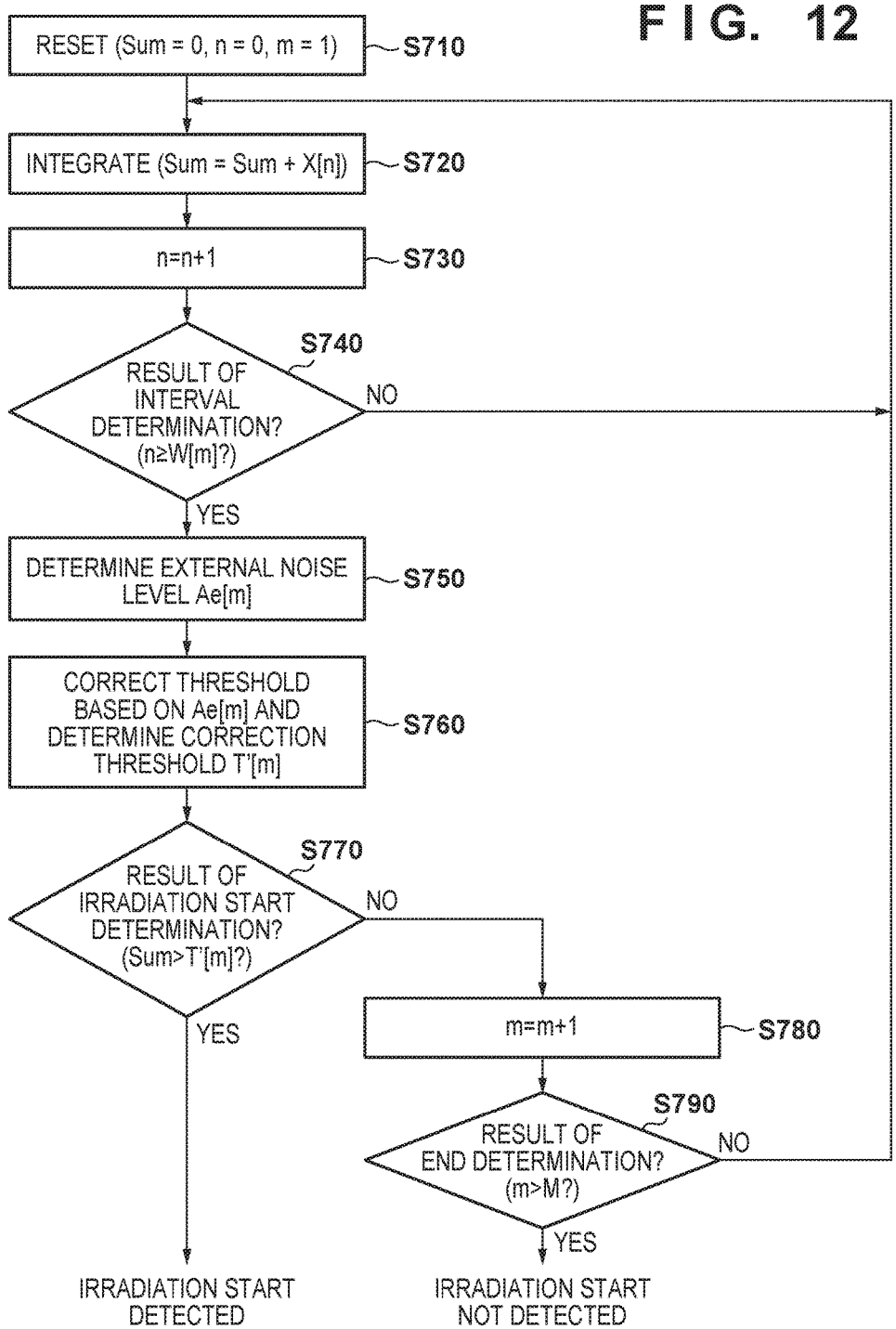
FIG. 12 is a flowchart for explaining the third embodiment of the present invention.

The third embodiment of the present invention will be described below as another modification of the first embodiment of the present invention. Note that matters not mentioned below can follow the first or the second embodiment. FIG. 12 shows the processing of detecting the start of radiation irradiation in the third embodiment. The processing shown in FIG. 12 can be applied to the process of step S320 in FIG. 4.

A controller 214 detects the start of radiation irradiation based on an integral value that has integrated the value of the detection signal from a detector 103. For example, the controller 214 can detect the start of radiation irradiation based on an integral value obtained by integrating X[n] representing either the detection signal from the detector 103 or X(y) obtained by processing the detection signal in accordance with the second embodiment. In this case, X[n] represents the detection signal from the detector 103 that has been sampled n values before. That is, X[0] is the latest detection signal, and the larger the value of n is, earlier the detection signal has been obtained.

In step S710, the controller 214 respectively gives initial values to Sum representing an integral value, n representing the index of a detection signal, and m (m is a natural number) representing an integral interval identification number. The initial values are Sum=0, n=0, and m=1, respectively. This is called resetting the integrator.

Next, in step S720, the controller 214 sets a value obtained by adding the integral value Sum and the radiation information X[n], which has been sampled n values before, as the new integral value Sum. That is, Sum=Sum+X[n].

Next, in step S730, the controller 214 executes n=n+1. Subsequently, in step S740, the controller 214 performs interval determination. In the interval determination of step S740, if n does not exceed a pre-designated value mth integral interval W[m] (NO), the process returns to step S720 to continue integrating (cumulative addition). On the other hand, if n exceeds W[m] (YES), the process advances to step S750.

In step S750, the controller 214 uses the integral value Sum in place of the aforementioned measured value V(t) to calculate an external noise level Ae[m](t) of the integral interval m. Then, in step S760, the controller 214 calculates a post-change threshold (correction threshold) T'[m] of the integral interval m by:

$$T'[m](t)=k[m]*Ae[m](t)+T[m] \quad (9)$$

where a threshold T[m] represents the pre-change threshold and k[m] represents the safety factor in the integral interval m. k[m] may be set for each integral interval or be a constant value.

In steps S750 and S760, the controller 214 changes the threshold T[m] or T'[m] set for each integral interval in accordance with the values of the noise evaluation range of the integral value Sum integrated for the integral interval.

In the irradiation start determination of step S770, if the integral value Sum exceeds the predetermined correction threshold T'[m] of the mth integral interval (YES), the controller 214 determines that radiation irradiation has been started. That is, the controller 214 detects the start of radiation irradiation by comparing the integral value Sum and the correction threshold T'[m] of the mth integral interval. Hence, the determination of step S320 of FIG. 3 is YES. On the other hand, if the integral value Sum does not exceed the correction threshold T'[m] of the mth integral interval (NO), the controller 214 executes m=m+1 in step S780 and performs end determination in step S790.

In step S770, if any of the plurality of integral values, obtained by integrating the detection signal of the detector 103 for each of the plurality of integral intervals, exceeds the threshold set for each corresponding integral interval in the monitoring range, the controller 214 determines that radiation irradiation has been performed.

If m does not exceed a number M of the integral interval in the end determination of step S790 (NO), the controller 214 returns to step S720 to continue integrating (cumulative addition). On the other hand, if m exceeds the number M of the integral interval in the end determination of step S790 (NO), the controller 214 determines that radiation irradiation has not been performed. Hence, the determination of step S320 of FIG. 3 is NO.

Each unit such as the controller 214 according to the above-described embodiments of the present invention can be implemented by a computer executing a program. A means for supplying the program to the computer, for example, a computer-readable recording medium such as a CD-ROM that records the program or a transmission medium such as the Internet that transmits the program can also be applied as the embodiment of the present invention. The above-described program can also be applied as the embodiment of the present invention. The program, the recording medium, the transmission medium, and a program product are incorporated in the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A radiation imaging apparatus comprising:
a pixel array including a plurality of pixels to capture a radiation image;
a detector configured to detect radiation irradiation to obtain measured values including values within a positive range with respect to a reference value and values within a negative range with respect to the reference value; and
a controller configured to control a radiation image capturing operation by the pixel array in accordance with determination that the radiation irradiation has started, the determination being performed based on a comparison between the measured values and a threshold value which is within one range of the positive range and the negative range,
wherein the controller changes the threshold value in accordance with only the values of the measured values, within the other range of the positive range and the negative range.

2. The apparatus according to claim 1, wherein the detector includes a differential amplifier configured to perform differential amplification on a difference between a signal which has sensitivity to radiation irradiation and a predetermined value, and the controller obtains the measured value based on a signal output from the differential amplifier.

3. The apparatus according to claim 2, wherein the signal having sensitivity to radiation irradiation is a signal which appears in an electrically conductive line arranged in the pixel array.

4. The apparatus according to claim 3, wherein the electrically conductive line includes a bias line configured to provide a bias voltage to all or a part of the plurality of pixels, and
the signal having sensitivity to radiation irradiation is a signal which appears in the bias line.

5. The apparatus according to claim 1, wherein the detector includes a sensor configured to convert radiation into an electrical signal.

6. The apparatus according to claim 1, wherein the controller changes the threshold value based on a maximum value in values of the measured values, within the other range of the positive range and the negative range and within a predetermined period.

7. The apparatus according to claim 1, wherein the controller determines a noise level included in the measured values in accordance with only the values of the measured values, within the other range of the positive range and the negative range, and determines the threshold value in accordance with the noise level.

8. The apparatus according to claim 7, wherein the controller determines a latest noise level based on latest measured values within the other range of the positive range and the negative range, and a past noise level.

9. The apparatus according to claim 1, wherein the controller determines an external noise level included in the measured values in accordance with only the values of the measured values, within the other range of the positive range and the negative range, and changes the threshold value in accordance with the external noise level.

10. The apparatus according to claim 1, wherein the controller changes the threshold value within a predetermined range.

11. The apparatus according to claim 1, wherein the measured value is a signal value obtained after noise reduction processing has been executed on the signal output from the detector.

12. The apparatus according to claim 1, wherein in a case in which any one of a plurality of integral values obtained by integrating, in each of a plurality of integral intervals, a detection signal output from the detector signal or a signal obtained by processing the signal exceeds a threshold set for a corresponding integral interval in the one range, the controller determines that radiation irradiation has been performed, and
the controller changes a threshold set for each integral interval in accordance with a value of the other range of the integral value obtained in the integral interval.

13. A radiation imaging system comprising:
a radiation source; and
a radiation imaging apparatus of claim 1.

14. An irradiation start detection method of detecting start of radiation irradiation in a radiation imaging apparatus that includes a pixel array including a plurality of pixels to detect radiation image and a detector configured to detect radiation irradiation to provide measured values including values within a positive range with respect to a reference value and values within a negative range with respect to the reference value, the method comprising:
determining a start of radiation irradiation based on a comparison between the measured values and a threshold value which is within one range of the positive range and the negative range, and
changing the threshold value in accordance with only the values of the measured values, within the other range of the positive range and the negative range.

15. A radiation imaging apparatus comprising:
a pixel array including a plurality of pixels to capture a radiation image;
a detector configured to detect radiation irradiation to obtain measured values including values within a positive range with respect to a reference value and values within a negative range with respect to the reference value; and
a controller configured to control a radiation image capturing operation by the pixel array in accordance with a determination that the radiation irradiation has started, the determination being performed based on a comparison between the measured values and a threshold value which is within one range of the positive range and the negative range,
wherein the controller changes the threshold value in accordance with the measured values except for any measured values having value within the one range.

16. The apparatus according to claim 15, wherein the detector includes a differential amplifier configured to perform differential amplification on a difference between a signal which has sensitivity to radiation irradiation and a predetermined value, and the controller obtains the measured value based on a signal output from the differential amplifier.

17. The apparatus according to claim 16, wherein the signal having sensitivity to radiation irradiation is a signal which appears in an electrically conductive line arranged in the pixel array.

18. The apparatus according to claim 17, wherein the electrically conductive line includes a bias line configured to provide a bias voltage to all or a part of the plurality of pixels, and
the signal having sensitivity to radiation irradiation is a signal which appears in the bias line.

19. The apparatus according to claim 15, wherein the detector includes a sensor configured to convert radiation into an electrical signal.

20. The apparatus according to claim 15, wherein the controller changes the threshold value based on a maximum value in measured values within a predetermined period and except for any measured values having value within the one range.

21. The apparatus according to claim 15, wherein the controller determines a noise level included in the measured values in accordance with the measured values except for any measure values having value within the one range and determines the threshold value in accordance with the noise level.

22. The apparatus according to claim 21, wherein the controller determines a latest noise level based on latest measured values except for any measured values having value within the one range, and a past noise level.

23. The apparatus according to claim 15, wherein the controller determines an external noise level included in the measured values in accordance with the measured values except for any measured values having value within the one range, and changes the threshold value in accordance with the external noise level.

24. The apparatus according to claim 15, wherein the controller changes the threshold value within a predetermined range.

25. The apparatus according to claim 15, wherein the measured values are signal values obtained after noise reduction processing has been executed on the signal output from the detector.

26. A radiation imaging system comprising:
a radiation source; and
a radiation imaging apparatus as in claim 15.

27. The apparatus according to claim 15, wherein in a case in which any one of a plurality of integral values obtained by integrating, in each of a plurality of integral intervals, a detection signal output from the detector signal or a signal obtained by processing the signal exceeds a threshold set for a corresponding integral interval in the one range, the controller determines that radiation irradiation has been performed, and
the controller changes a threshold set for each integral interval in accordance with a value of the other range of the integral value obtained in the integral interval.

28. A radiation imaging apparatus comprising:
a pixel array including a plurality of pixels to capture a radiation image;
a detector configured to detect radiation irradiation to obtain a measured result which changes within positive and negative ranges with respect to a reference value; and
a controller configured to control a radiation image capturing operation by the pixel array in accordance with a determination that the radiation irradiation has started, the determination being performed based on a comparison between the measured result and a threshold value which is within one range of the positive and the negative ranges,
wherein the controller changes the threshold value in accordance with the measured result, except for the measured result within the one range.

29. The apparatus according to claim 28, wherein the detector includes a differential amplifier configured to perform differential amplification on a difference between a signal which has sensitivity to radiation irradiation and a predetermined value, and the controller obtains the measured result based on a signal output from the differential amplifier.

30. The apparatus according to claim 29, wherein the signal having sensitivity to radiation irradiation is a signal which appears in an electrically conductive line arranged in the pixel array.

31. The apparatus according to claim 29, wherein the electrically conductive line includes a bias line configured to provide a bias voltage to all or a part of the plurality of pixels, and
the signal having sensitivity to radiation irradiation is a signal which appears in the bias line.

32. The apparatus according to claim 28, wherein the detector includes a sensor configured to convert radiation into an electrical signal.

33. The apparatus according to claim 28, wherein the controller changes the threshold value based on a maximum value in the measured result, within a predetermined period and except for the measured result within the one range.

34. The apparatus according to claim 28, wherein the controller determines a noise level included in the measured values in accordance with the measured result except for the measure result within the one range and determines the threshold value in accordance with the noise level.

35. The apparatus according to claim 34, wherein the controller determines a latest noise level based on latest measured result except for the measured result within the one range, and a past noise level.

36. The apparatus according to claim 28, wherein the controller determines an external noise level included in the measured result in accordance with the measured result except for the measured result within the one range, and changes the threshold in accordance with the external noise level.

37. The apparatus according to claim 28, wherein the controller changes the threshold within a predetermined range.

38. The apparatus according to claim 28, wherein the measured result is a signal obtained after noise reduction processing has been executed on the signal output from the detector.

39. The apparatus according to claim 28, wherein in a case in which any one of a plurality of integral values obtained by integrating, in each of a plurality of integral intervals, a detection signal output from the detector signal or a signal obtained by processing the signal exceeds a threshold set for a corresponding integral interval in the one range, the controller determines that radiation irradiation has been performed, and
the controller changes a threshold set for each integral interval in accordance with a value of the other range of the integral value obtained in the integral interval.

40. A radiation imaging system comprising:
a radiation source; and
a radiation imaging apparatus as in claim 28.

* * * * *